A. V. & I. F. FAUSEK.
WELDING AND CUTTING TORCH.
APPLICATION FILED APR. 11, 1912.
1,066,192.
Patented July 1, 1913.
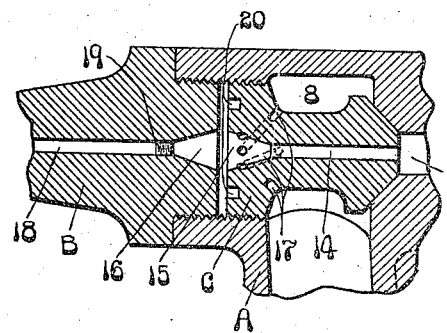
Fig. III.
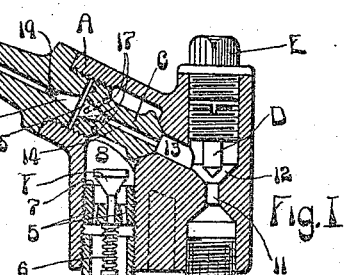
Fig. I.
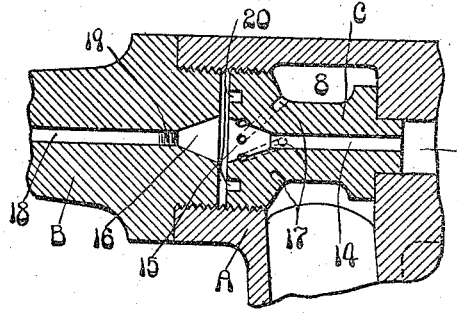
Fig. IV.
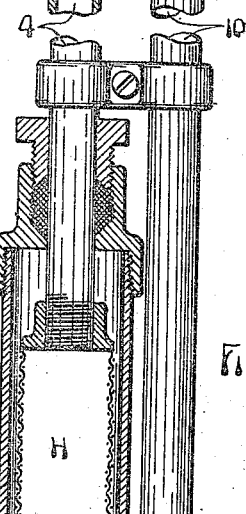
Fig. II.
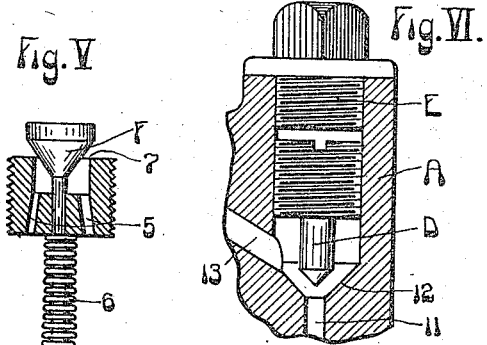
Fig. V.   Fig. VI.
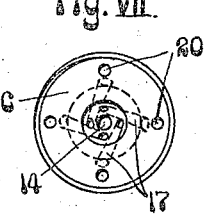
Fig. VII.
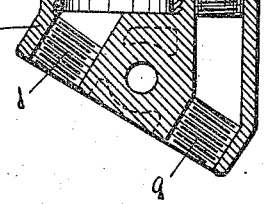
Attest.
A. J. Fausek.
Amelia Fausek.
Inventors:
A. V. Fausek
I. F. Fausek

UNITED STATES PATENT OFFICE.

ALEXANDER V. FAUSEK AND IRWING F. FAUSEK, OF ST. LOUIS, MISSOURI.

WELDING AND CUTTING TORCH.

1,066,192. Specification of Letters Patent. Patented July 1, 1913.

Application filed April 11, 1912. Serial No. 690,132.

*To all whom it may concern:*

Be it known that we, ALEXANDER V. FAUSEK and IRWING F. FAUSEK, both citizens of the United States of America, and residents of the city of St. Louis and State of Missouri, have invented certain new and useful Improvements in Welding and Cutting Torches, of which the following is a full, clear, and exact description, reference being had to the accompanying drawings, forming a part of this specification.

This invention relates to certain novel and useful improvements in a welding and cutting torch or burner employing acetylene and oxygen gases under pressure, or other combustible and combustion supporting gases under pressure to produce a flame of high temperature.

In carrying out our invention, it is our purpose to provide a novel means for mixing the combustible and combustion supporting gases under pressure so that a more perfect mixture can be obtained and maintained.

Still a further object of the invention is the provision of means in the torch whereby the danger of back firing is eliminated.

We also aim to provide for the accurate proportion of the gases entering the mixing chamber so that the proper mixture may be fed to the torch nozzles.

Furthermore, we provide an interchangeable nozzle or tip which is independent of the mixing head.

With the above recited objects and others of a similar nature in view, our invention consists in the construction, combination and arrangement of parts set forth in and falling within the scope of the appended claims.

In the accompanying drawings:—Figure I is a vertical sectional view taken through the entire head of the torch and showing the separate gas conduits connected thereto. Fig. II is a view partly in vertical section and partly in elevation, showing the body portion of the torch which includes the casing forming the handle and the separate gas conduits. Fig. III is an enlarged central sectional view through the mixing head, and showing a part of the housing and the nozzle. Fig. IV is a similar view of a modification. Fig. V is an enlarged central part sectional view of the automatic spring-closing check valve. Fig. VI is an enlarged central part sectional view of the screw adjusting valve located in the combustion supporting gas conduit, and screw plug to seal opening. Fig. VII is an enlarged end view of the mixing head looking from the tip of the torch.

Referring now to the accompanying drawings in detail, the letter A illustrates the housing of the head of the torch, while B indicates the interchangeable nozzle or tip which receives the mixed gases from the interchangeable mixing head C. D represents the screw adjusting valve and E the screw plug while F is an automatic spring closing valve controlling the companion gas conduit to that provided with the screw valve D. Within the casing or chamber 2 is located a cylindrical tube H formed of fine wire gauze screen, while the letter I indicates the tailpiece of the torch.

The combustible gas enters through the conduit 1 into the chamber or casing 2 in which is located the gauze screen H. It then passes through this screen into the pipe or conduit 4 and thence to the automatic spring closing check valve F. The gas passes through the passages 5 and lifts the valve F from its seat 7 compressing the spring 6 and filling the space 8 with the combustible gas.

The combustion supporting gas enters through the passage 9 and passes through the conduit or pipe 10 and through the reduced passage 11 to the valve D which seats on the seat 12. After passing this valve, the combustion supporting gas flows through the laterally inclined channel 13 in the housing and thence through the longitudinal bore 14 of the mixing head to the mixing chamber formed by the conical diverging channel 15 of the mixing head and the conical converging channel 16 in the adjacent end of the torch tip or nozzle. The rushing of the combustion supporting gas through these conical channels reduces the pressure in the spirally located passages 17 in the mixing head C, thus drawing in the combustible gas from the space 8. Near the conical end of the passage 16 are located threads 19 which are reverse to this whirling motion of the gases and tend to check such motion. From the mixing chamber the mixed gases pass out through the passage 18 of the nozzle to the air for ignition. In the discharge end of the mixing head are the pin wrench holes 20 for changing the mixing heads.

We are aware of the fact that torches have been made for burning a mixture of two gases such as oxygen and acetylene, but we believe ours to be superior to the structures with which we are acquainted in that we provide our torch with an automatic spring closing check valve located within the housing or head of the torch as near as possible to the mixing head C. Thus in case of back fire or back burning, this valve will close immediately, thus usually preventing the flame from running through the body of the torch. This is a decided advantage over a torch provided with a check valve located in the handle or receiver chamber where it would not respond quickly to the pressure or would be located too distant to prevent the flame running along through the body of the torch. A further important feature of our torch is the fine wire gauze screen H which is at the opposite end of the same conduit having the valve F. This screen acts as a supplemental or secondary check for back firing and in addition screens out all particles of foreign matter carried in suspension in the gas.

It is desirable in welding light and heavy materials to employ flames of different magnitudes, and this is accomplished by nozzles or tips of different bore, and by means of several interchangeable mixing heads, it will be possible to accomplish a very large range of work. A very important feature of all welding torches is the construction of the mixing head. In our torch, like all others, we depend on the ratio of the areas of the gas passages to give the proper mixture, but we provide a valve D to adjust the final ratio of the mixture more accurately, thus having better control of the quality of the flame which is so important to good welding.

While we have herein shown and described one particular embodiment of our invention, we wish it to be understood that we do not confine ourselves to all the precise details of construction herein set forth, as modifications and variation may be made without departing from the spirit of the invention or exceeding the scope of the appended claims.

What we claim is:—

1. In a torch of the class described, the combination with a housing and a nozzle therefor, of a plurality of separate gas conducting tubes connected with the housing, a mixing chamber for the gases in the housing, a valve located at one end of one of said tubes and within the housing and adapted to be closed automatically by back pressure in the housing whereby back fire in said tube is prevented, and a screen connected with the other end of the said last mentioned tube.

2. In a torch of the class described, the combination with a housing and a mixing head therein, of a gas conducting tube extending into the housing, a valve located at the end of the tube within the housing and adapted to be closed automatically by back pressure in the housing whereby back fire in said tube is prevented, and a screen carried at the opposite end of the tube remote from the housing.

3. In a torch of the class described, the combination with a housing provided with a mixing chamber, of a gas conducting tube connected with the housing, a valve located at that end of the tube which communicates with the housing and adapted to be closed automatically by back pressure in the housing whereby back fire in said tube is prevented, a tubular screen at the opposite end of the tube remote from the housing, a casing surrounding the tubular screen, and a second gas conducting tube extending adjacent the first mentioned tube and communicating with the housing.

4. In a torch of the class described, the combination with a housing provided with a mixing chamber, of a plurality of separate gas conducting tubes leading to the housing, an adjustable valve for one of said tubes, a valve for the other of said tubes located at that end of the tube which communicates with the housing and adapted to be closed automatically by back pressure in the housing whereby back fire in said tube is prevented, a casing connected with the last mentioned tube, and a screen located within the casing and connected with the end of such last mentioned tube remote from the housing.

5. In a torch of the class described, the combination of a housing having separate passages formed therein, and a channel leading from one of the passages, separate gas conducting tubes communicating with said passages, an adjustable valve for controlling the flow of gas from one of said passages to the channel leading therefrom, a mixing head within the housing, said mixing head having a mixing chamber and a passage communicating with the channel, a detachable nozzle connected with the housing and provided with a bore terminating in an opening communicating with the mixing chamber of the mixing head, an automatic valve located at the end of one of the gas conducting tubes, and a tubular screen at the opposite end of the last mentioned gas conducting tube.

6. A torch of the class described provided with separate conduits for two gases under pressure, an interchangeable tip having a shouldered end constituting a seal and formed with a longitudinal passage, one end of said passage being flared to form a conical opening, means for conducting gases from said conduits to the conical opening, and threads cut in said longitudinal passage near the apex of the conical opening to mix the gases.

7. In a torch of the class described, the combination of a housing having separate passages formed therein, separate gas conducting conduits communicating with said passages, a channel leading from one of the passages, an adjustable valve for controlling the flow of gas from the last mentioned passage to the channel, a mixing head within the housing adjacent the other passage, said mixing head having a mixing chamber therein and ports spirally arranged leading therefrom, said head having a bore communicating with the channel, a detachable nozzle connected with the housing and provided with a longitudinal bore terminating in a conical opening communicating with the mixing chamber of the mixing head, and threads cut in said longitudinal passage near the conical opening to mix the gases.

8. In a torch of the class described, the combination with a housing and a mixing head therein, of a gas conducting tube communicating with the housing, and a valve located at that end of the tube which communicates with the housing and adapted to be closed automatically by back pressure in the housing whereby back fire in said tube is prevented.

A. V. FAUSEK.
I. F. FAUSEK.

In the presence of—
F. A. PENTLAND,
AMELIA FAUSEK.